2 Sheets-Sheet 1.

J. F. Seiberling.

Harvester Dropper.

No. 1701

Reissued June 4, 1901

2 Sheets. Sheet. 2.

J. F. Seiberling,
Harvester Dropper.

No. 1701. Reissued. June. 14. 1864.

G. Bund
A. Bruce } Jr.

John F. Seiberling
by
Daniel Bread. Atty

UNITED STATES PATENT OFFICE.

JOHN F. SEIBERLING, OF DOYLESTOWN, OHIO.

IMPROVEMENT IN HARVESTERS.

Specification forming part of Letters Patent No. 33,496, dated October 15, 1861; Reissue No. 1,701, dated June 14, 1864.

DIVISION D.

*To all whom it may concern:*

Be it known that I, JOHN F. SEIBERLING, of Doylestown, in the county of Wayne and State of Ohio, have invented a new and useful Improvement in Harvesters; and I do hereby declare that the following is a full and exact description thereof, reference being had to the accompanying drawings, and to the letters of reference marked thereon.

Many different arrangements have been employed for folding the finger-beam of harvesters, as the reel and platform interfere with such operation. After much experience and study I have succeeded in so hinging the finger-beam in connection with a caster-wheel at its outer end that the finger-beam, reel, and platform may be conveniently folded for transportation.

My invention consists in a peculiar arrangement for supporting and hinging the heel of the finger-beam.

Figure 1:
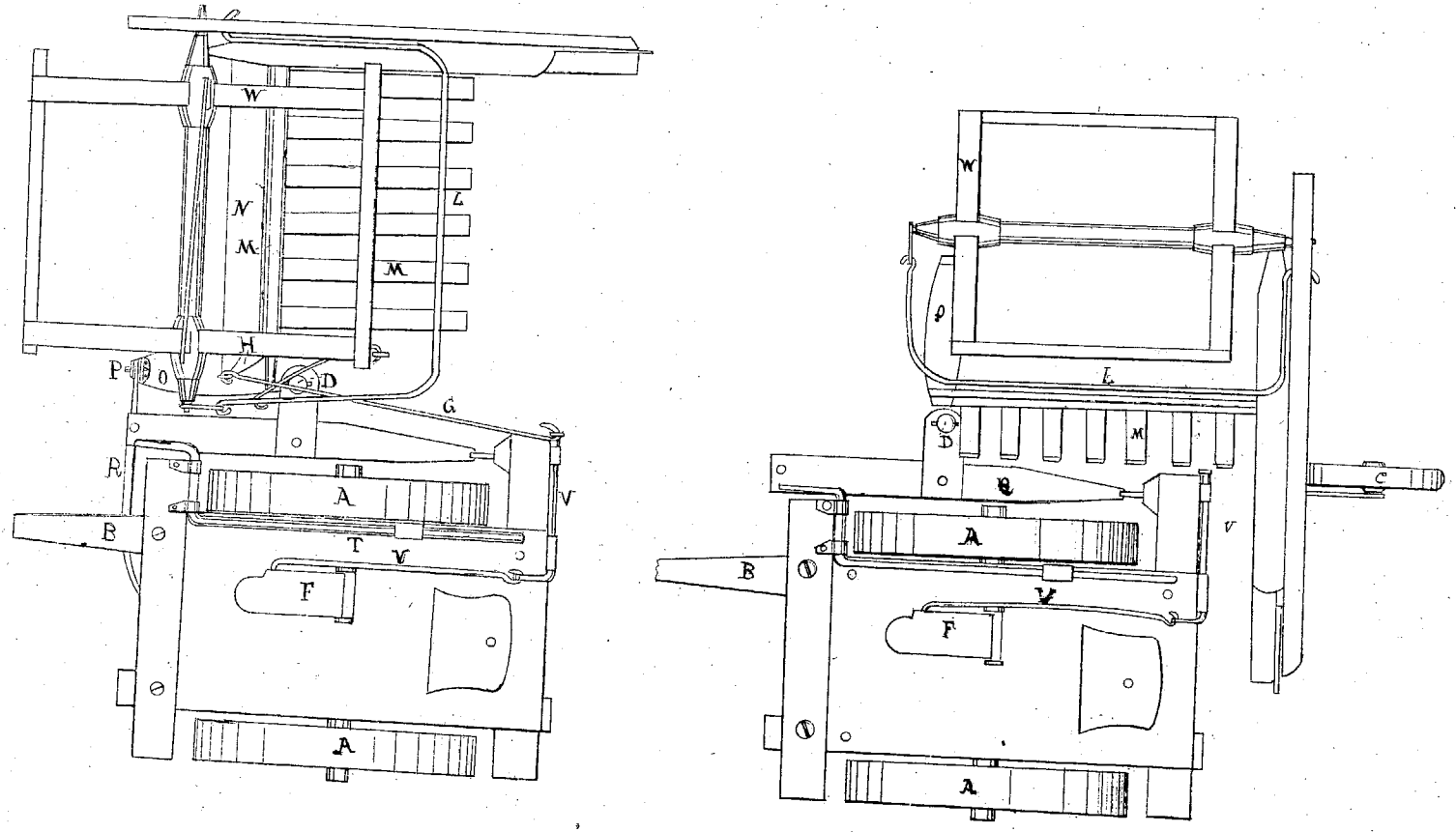
Figure 3:
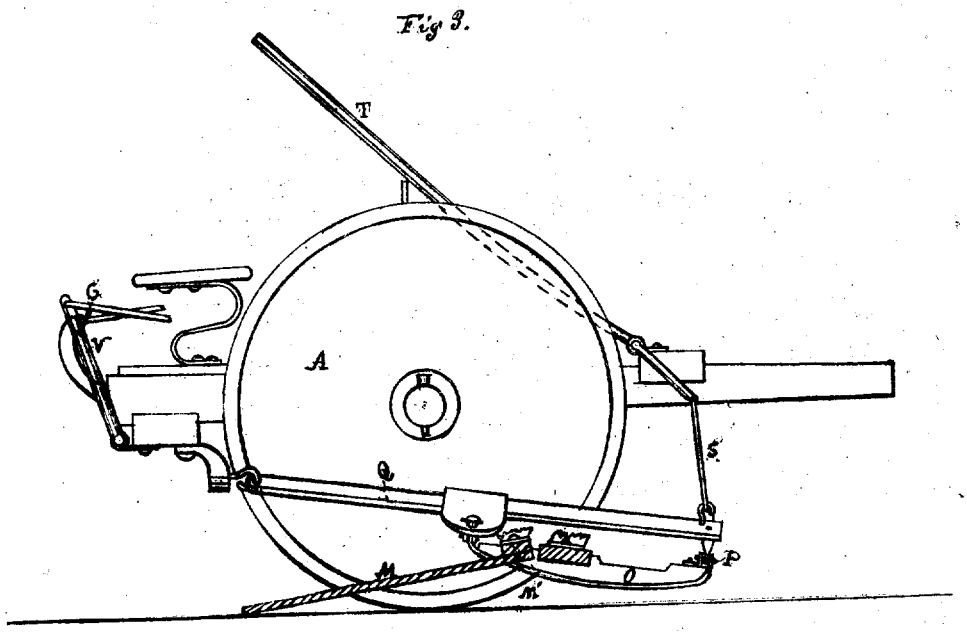

In the accompanying drawings, Figure 1 is a top view of my harvester. Fig. 3 (there being no Fig. 2) is a section through the platform, also a lateral elevation of part of the machine, the reel and some other parts being omitted in the figure. Fig. 4 is a top view, showing the finger-beam folded backward.

The main frame of my harvester is supported on two wheels, A, the machine being drawn in the usual manner. The heel or inner end of my finger-beam N rests upon and is firmly connected with the bar or shoe O, which has flexible connections, soon to be described. The outer end of the finger-beam, as well as of the reel and platform, rest upon the outer shoe, which is supported by a caster-wheel. The inner shoe, O, has two hinges or joints, P and D, which give some flexibility, while they hold the shoe and finger-beam strongly in working position. The bar or lever R, Fig. 1, is pivoted at one end to the main frame, and the bar Q is held by a link at its rear end, thus giving the shoe O additional play up and down to meet the undulations of the ground, while the other end is connected by link S to lever T. By means of lever T the driver can elevate or depress the lever R, shoe O, and finger-beam at pleasure. This arrangement for connecting the finger-beam with the main frame gives all the necessary flexibility and also firmness for the most successful operation of the machine.

The outer shoe is supported by a caster-wheel, (best seen at *c*, Fig. 4, where the caster-wheel is turned out from under the shoe.) This shoe is so balanced upon the caster-wheel as to ride easily over the undulations of the ground and keep the finger-beam in proper working position. The caster-wheel not only supports the shoe, but also carries the dividing-board, the outer end of the finger-beam, of the reel, and of the platform, thus preventing the otherwise heavy side drag of the machine.

The combination of the above-described hinged finger-beam and the caster-wheel enables me very conveniently to fold the finger-beam for transportation or passing gateways.

The folding is accomplished in the following manner: The bar Q and the bar or lever R, being hinged as above described, and also firmly connected, may be elevated or depressed by the crooked lever T, thus also elevating or depressing the shoe O and heel of the finger-beam. When the finger-beam is to be folded, the heel of the same is elevated, as seen in Fig. 3. The cut-off L and the rear end of fingers M should be elevated, and the rod G unhooked and thrown up so as to rest on the cut-off. Then the forward end of the shoe O must be released by withdrawing the pin or pivot from the joint P. Now, by starting the team the finger-beam folds automatically backward to the side of the machine, as seen in Fig. 4. As the finger-beam folds backward the caster-wheel plays outward from the shoe, and by means of its long hinge transfers the point of support forward upon the shoe, thus enabling the caster-wheel better to balance and carry its load in connection with joint D at the other end of the finger-beam.

Having thus described my invention, what I claim, and desire to secure by Letters Patent of the United States, is—

The arrangement of the hinged bars Q and R for supporting the heel of the cutter-beam and for elevating and depressing the same and the reel by means of lever T or other device, said hinged bars being used in connection with the shoe or bar O and its flexible attachment, substantially as set forth.

JOHN F. SEIBERLING.

Witnesses:
AMOS HENRICKS,
ABRAHAM B. CAPP.